United States Patent [19]

Shirley

[11] 4,453,168
[45] Jun. 5, 1984

[54] RECTILINEAR PEN MOVEMENT APPARATUS FOR RECORDING GALVANIC SKIN RESISTANCE

[75] Inventor: Richard L. Shirley, Lafayette, Ind.

[73] Assignee: Lafayette Instrument Co., Inc., Lafayette, Ind.

[21] Appl. No.: 400,736

[22] Filed: Jul. 22, 1982

[51] Int. Cl.³ .................... G01D 15/16; G01D 15/24
[52] U.S. Cl. ............................ 346/117 A; 346/139 R
[58] Field of Search ............... 346/117 A, 112, 139 R, 346/32; 74/102, 103

[56] References Cited

U.S. PATENT DOCUMENTS

| | | | |
|---|---|---|---|
| 3,188,651 | 2/1963 | Offner | 346/117 A |
| 3,206,756 | 9/1965 | Thayer et al. | 346/112 |
| 3,317,915 | 11/1964 | Thompson | 346/117 A |
| 4,115,734 | 9/1978 | Zoltan | 346/139 R X |

*Primary Examiner*—George H. Miller, Jr.
*Assistant Examiner*—Todd E. DeBoer
*Attorney, Agent, or Firm*—Woodard, Weikart, Emhardt & Naughton

[57] ABSTRACT

A rectilinear pen movement apparatus is provided which is responsive to an electrical signal representing a measurement of galvanic skin resistance in order to provide a record of galvanic skin resistance on a chart recording medium. There is provided a support frame and a drive motor mounted to the frame. The drive motor has an output means which rotates on a first axis in response to an input signal representing an electrical measurement of galvanic skin resistance. An input shaft connected to a potentiometer senses the rotation of the output means and provides negative feedback. The input shaft also serves as a step up movement for rotating a swing disc on a second axis parallel to the first axis. A recording pen is supported for rotation about the second axis by a support shaft which is rigidly attached to the swing disc. The support shaft rotates on a third axis parallel to the first and second axis so that the tip of the recording pen moves rectilinearly in response to rotation of the output means. The negative feedback from the potentiometer is used to modify the input signal thereby minimizing hysteresis and friction effects while improving linearity of the travel at the tip of the recording pen.

6 Claims, 4 Drawing Figures

RECTILINEAR PEN MOVEMENT APPARATUS FOR RECORDING GALVANIC SKIN RESISTANCE

BACKGROUND OF THE INVENTION

1. Field of the Invention

The present invention relates generally to chart recording devices and more particularly to devices which are suitable for producing rectilinear motion of the recording instrument transverse to the direction of travel of the chart medium.

2. Description of the Prior Art

One of the recording channels in a polygraph machine records galvanic skin resistance which is quite sensitive to subject responses due to the fact that galvanic skin resistance ("GSR") readings may vary widely during a typical polygraph test. This creates a need for a wide swinging pen movement in order to accurately and continuously measure this variable. Since a polygraph machine will typically also simultaneously record other body functions on separate recording pens, it is necessary that the recording pen which records galvanic skin resistance not collide with the other recording pens. Thus, the need to recenter the wide swinging GSR recording pen is decreased and a more homogeneous or unbroken recording is thereby produced.

Previous devices for recording galvanic skin resistance have used recording pens which track along a curvilinear or radial arc in response to the electrical signal being recorded. Curvilinear pen movement is, however, undesirable for several reasons. For example, in order to allow the recording pen to produce a tracing which includes the full width of the recording medium, the recording pen is typically placed so that at zero deflection it is far out beyond the tips of the other pens. While this design reduces the chances of the GSR pen from colliding with the other pens at extreme angular deflection, it also creates unnecessary errors in chart timing between it and the other recording pens. While this error can be reduced by lengthening the recording pen, the need for a compact design renders this design choice unacceptable. Furthermore, since it is the length of the arc which is proportional to the electrical signal being measured, interpretation of data is more difficult than would otherwise be the case if the recording was rectilinear. It would, therefore, be an improvement to provide a pen movement for recording galvanic skin resistance in a polygraph machine which pen movement produces a rectilinear tracing across the full width of the chart paper, yet which does not collide with the other pens and maintains a constant clearance or time difference with respect to the other pen recordings.

One device, to which the present invention is an improvement, is U.S. Pat. No. 3,206,756 to Thayer et al. which discloses means for converting a rotary motion into a rectilinear movement in a recording instrument. Rectilinear movement is accomplished in this device by a pen arm attached to a pulley which is in turn connected by a belt to a stationary drum. The pulley and the drum are also connected by a driving arm which is secured to a shaft which is coaxial with the drum and allows the pulley to rotate about the drum. Attachment tabs securing the belt to the pulley and drum are spaced radially outwards from the surface of the pulley and drum to prevent slippage The following list of patent references discloses other devices which may have some general relevance to the subject invention:

| U.S. Pat. No. | Inventor's Name |
| --- | --- |
| 3,065,468 | Edstrom |
| 3,185,990 | Millar |
| 3,205,504 | Nishimura et al. |
| 3,754,281 | Kampf |
| 4,180,823 | Guyot et al. |
| 2,149,216 | Gravley |

U.S. Pat. No. 3,065,468 to Edstrom discloses a slave recording apparatus which is adapted to operate as a slave to a conventional rotating drum and pen type recorder, or in the alternative as a direct recorder. The device operates by driving a reciprocating table through a rack and pinion gear train by either an X axis or a Y axis drive mechanism. The X axis or Y axis drive mechanism which does not drive the rack and pinion gear train is linked to drive at least one scribe mounted independently of but adjacent to the reciprocating table in such manner as to be moveable in the same plane as a perpendicular to the direction of movement of the table.

U.S. Pat. No. 3,185,990 to Millar discloses a system for translating the angular motions of a galvanometer shaft into traces which are substantially straight or rectilinear and proportioned in relation to the angular motions of the galvanometer. The device includes a pair of pivotally mounted levers having their free ends converging towards each other and a link pivotally interconnecting the free ends of the levers. A stylus arm is connected with the link to move therewith in its pivotal motion and carries a recording tool cooperating with a recording element and located at the side of a shaft which oscillates about its axis in accordance with a variable to be recorded.

U.S. Pat. No. 3,205,504 to Nishimura et al. discloses a multi-point marking device for recorders wherein a pen carriage receiving a plurality of pens travels on a rotatable guide bar in response to the movement of a pulley system consisting of three sets of pulleys.

U.S. Pat. No. 3,754,281 to Kampf discloses a rectilinear stylus system for use with chart recorders. The stylus system comprises a stylus arm pivotally connected to a drive means which includes an endless flexible chain driven by a servomotor-operated sprocket. The stylus is secured at its free end for movement along a rectilinear path to a guide surface. A pen is secured to the chain and is slideably retained in a slot within the lower surface of the stylus arm. A potentiometer resistance element is suspended beneath the stylus arm and a wiper on the stylus arm contacts the potentiometer element to develop a position signal which is utilized to reduce stylus position error.

U.S. Pat. No. 4,180,823 to Guyot et al. discloses a control device for controlling the movements of two carriages of a duplex recorder. The device includes a flexible traction means connected to a first carriage and a drive means associated with the traction means for moving the first carriage selectively in two opposite directions.

U.S. Pat. No. 2,149,216 to Gravley discloses a motion-converting mechanism for magnifying and reducing linear motion and for converting linear motion into angular motion and vice versa.

None of the above references, however discloses a device which accomplishes the objects of the present invention.

Accordingly, it is an object of the present invention to provide an improved rectilinear pen movement apparatus for recording galvanic skin resistance.

This and other objects and advantages of the present invention will become more apparent in the following figures and detailed description.

SUMMARY OF THE INVENTION

One embodiment of the present invention includes a rectilinear pen movement apparatus responsive to an electrical input signal which represents a measurement of galvanic skin resistance in order to provide a recorded analog representation of the input signal. There is provided a support frame and a drive motor mounted to said frame. The drive motor has an output means which includes a cylindrically shaped surface. The output means is capable of rotating on a first axis in response to an input signal representing an electrical measurement of galvanic skin resistance. A feedback means having an input shaft capable of rotating on a second axis parallel to the first axis is also mounted to the frame. A first belt engages the output means and the input shaft in order to rotate the input shaft in direct proportion to the rotation of the output means. The feedback means senses rotation of the output shaft and produces a negative feedback signal. A first hub is connected to the input shaft and is rotatable on the second axis. A pen support means is rotatably mounted to the first hub and is rotatable on a third axis parallel to the first and second axes. A second stationary hub is rigidly connected to the frame and has a surface which is cylindrically shaped about the second axis. A second belt engages the second stationary hub and the pen support means in order to rotate the support means as the first hub is rotated on the second axis. A recording pen having first and second ends is connected to the support means so that the second free end is moveable rectilinearly in response to rotation of the output means in order to provide a recorded analog representation of the input signal. The negative feedback signal from the feedback means is used to modify the input signal thereby minimizing hysteresis and friction effects while improving linearity of the travel of the recording pen.

DESCRIPTION OF THE PREFERRED EMBODIMENT

Figure 1:
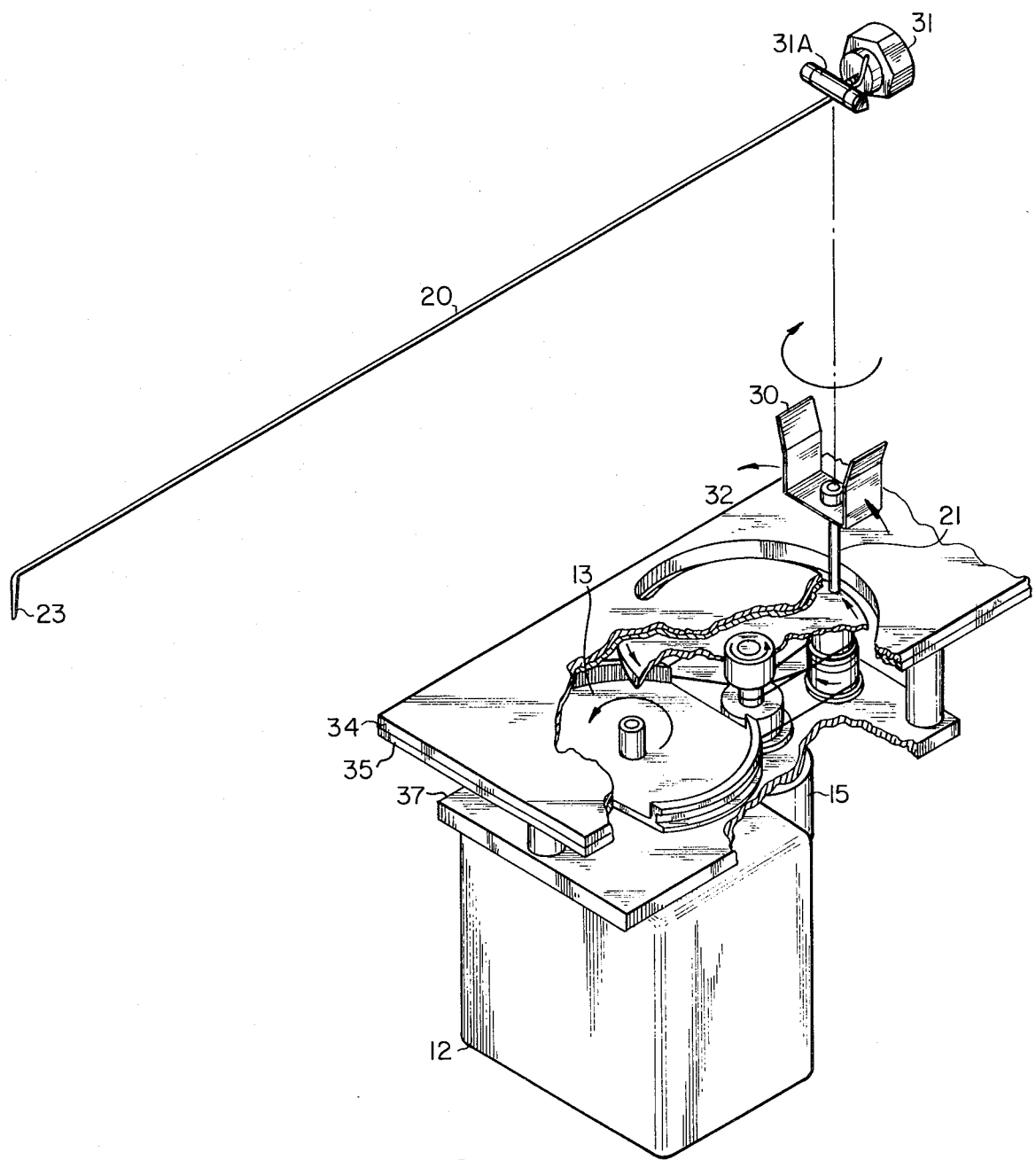
FIG. 1 is a perspective view of the rectilinear pen movement apparatus of the present invention with certain sections broken away in order to more clearly show the belt linkage.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 2:
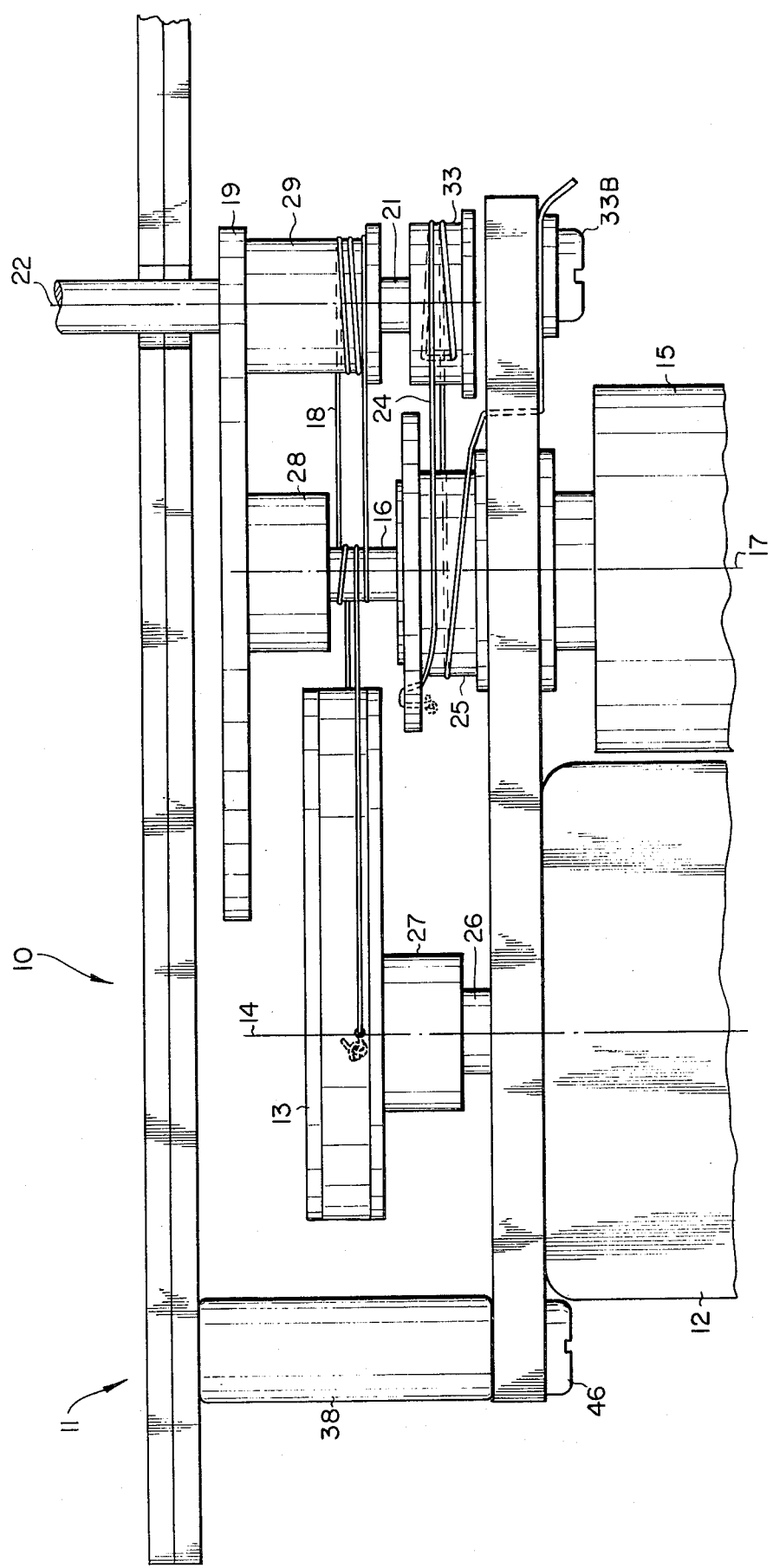
FIG. 2 is an elevational view of a schematic representation of the present invention more clearly showing the connection of the belts to the drive motor, the feedback means, and the pen support shaft.

Referring now to the drawings and more particularly to FIG. 2 thereof, portions of the rectilinear pen movement apparatus are shown schematically in an elevation view. Rectilinear pen movement apparatus 10 includes support frame generally designated at 11 to which is mounted a drive motor 12. Drive motor 12 provides rotary movement to drive disc 13 which is rotatable on axis 14. A potentiometer 15 is also mounted to support frame 11 and includes an input shaft 16 capable of rotating on axis 17 which is parallel to axis 14. A belt 18 engages drive disc 13 and input shaft 16 in order to rotate the input shaft in direct proportion to the rotation of drive disc 13. Thus, input shaft 16 senses the rotational movement of drive disc 13 and causes potentiometer 15 to deliver a negative feedback voltage to an amplifier (not shown) which powers drive motor 12, as will be more fully described hereinafter. Swing disc 19 is connected to the upper end of input shaft 16 and is rotatable on axis 17. Thus, as drive disc 13 is rotated by drive motor 12, belt 18 will cause input shaft 16 to rotate which in turn, causes swing disc 19 to rotate. Recording pen 20 is rigidly attached at one end to pen support shaft 21 which is rotabably mounted to swing disc 19 so that pen support shaft 21 rotates on axis 22 parallel to axis 17. Thus, pen support shaft 21 rotates about axis 17 while at the same time rotating in an opposite direction on axis 22, thereby producing rectilinear movement at tip 23. Rotation of pen support shaft 21 on axis 22 is accomplished by belt 24 which engages stationary hub 25.

In the embodiment illustrated, drive motor 12 is a conventional 100 mA. torque motor having an angular deflection of ±15°. Drive motor 12 is produced by General Scanning, Inc. of Watertown, Mass. under model no. Z986. It should be understood that drive motor 12 is driven by an amplifier which produces an analog output signal representing galvanic skin resistance. Drive motor 12 includes drive shaft 26 which is fittingly received mounting hub 27. Mounting hub 27 may be secured by any suitable means, such as a set screw. Drive disc 13 is press fitted over mounting hub 27 for secure attachment thereto. It is understood that drive disc 13 and mounting hub 27 may alternatively be formed as one integral part.

Figure 4:
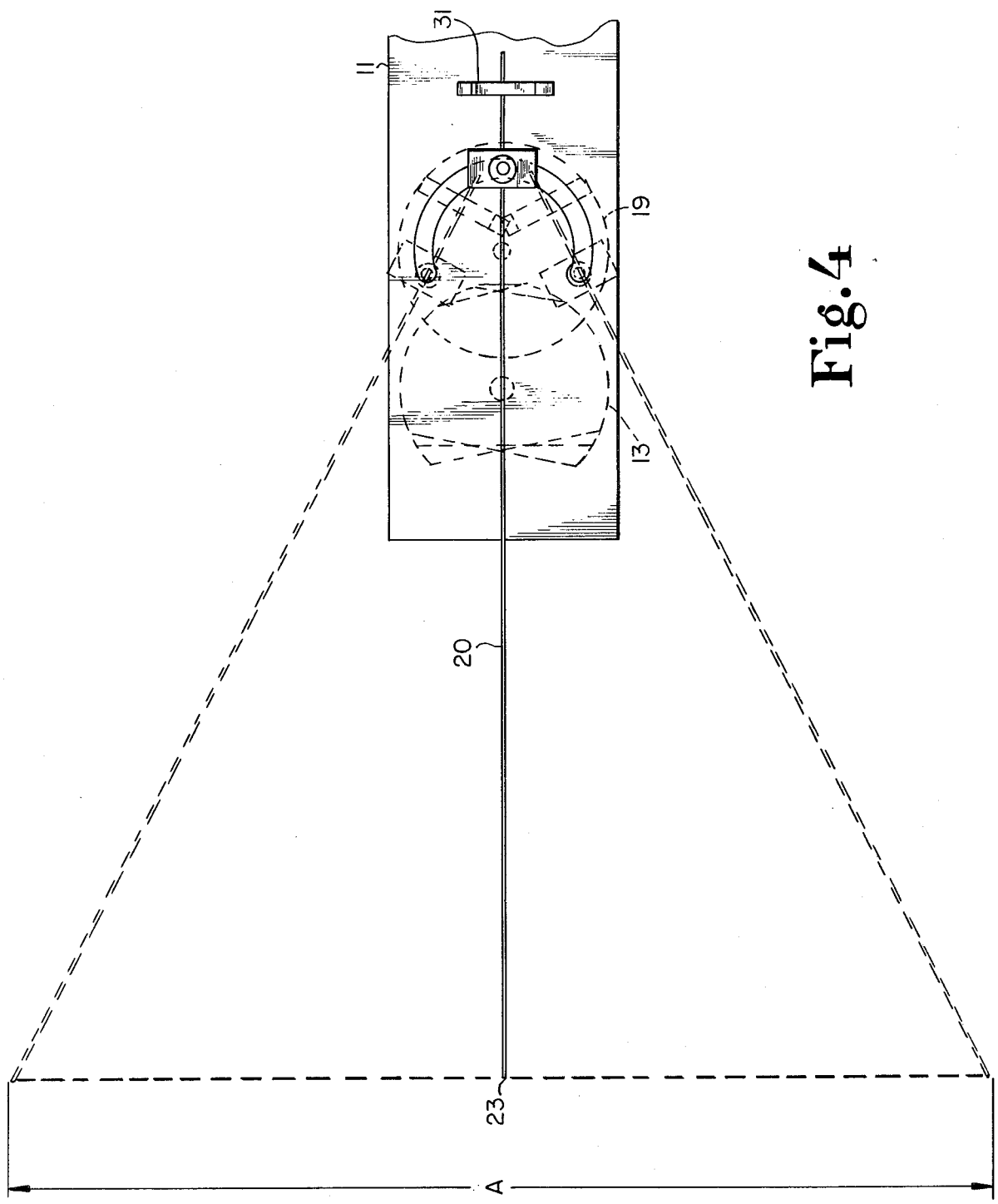
FIG. 4. is a top plan view of a schematic representation of the present invention showing the movement of the recording pen.

It should be noted that in order to permit drive motor 12 to produce rectilinear motion over the entire 8" width A (FIG. 4) of typically sized chart paper, a rotational step-up movement is necessary. This is provided by input shaft 16 of potentiometer 15, which also senses the rotational movement of drive disc 13 for negative feedback purposes. Potentiometer 15 is a 10K linear potentiometer produced by Bourns, Inc. of Riverside, California under model no. 6637S-1-103. Input shaft 16 has $\frac{1}{8}$" diameter and a rotational step-up ratio of 1:10 is provided by disc 13 which has a cylindrical surface having a $1\frac{1}{8}$" diameter.

Input shaft 16 and drive disc 13 are connected by belt 18. Due to the relatively small diameter of input shaft 16 and the low initial torque available from drive motor 12, the need for a strong, flexible, non-stretch durable belt is critical to eliminate sources of error such as friction, hysteresis, etc. For these purposes it has been found that the use of a 30 lb. test nylon fishing line for belt 18 and belt 24 is suitable. One end of belt 18 is firmly attached to drive disc 13 via a knot. Belt 18 is then tightly wrapped once around input shaft 16 whereupon it is connected to swing disc 19 by swing disc hub 28 which is firmly secured to swing disc 19 by press fitting. It should be noted that swing disc 19 and swing disc hub 28 may alternatively be one integrally formed part. Belt 18 is then tightly wrapped twice around bearing sleeve 29 which is firmly attached to swing disc 19. Belt 18 is then brought back for another single wrap around input shaft 16, whereupon it is firmly attached to drive disc 13 on the opposite side from which belt 18 is knotted. Belt 18 is secured tightly upon drive disc 13 by a screw (not shown). A suitable adhesive is then sparingly applied to the knot and screw head in order to secure them from slipping relative to drive disc 13. Adhesive may also be applied to the wrap of belt 18 on the far side of bearing sleeve 29 in order to further guard against slipping.

It should be noted that running belt 18 between input shaft 16 and bearing sleeve 29 has no effect on the movement, but serves as a means by which belt 18 can be tightly secured from slipping on input shaft 16 without interfering with the movement of input shaft 16. Thus, input shaft 16 serves to impart the necessary amount of rotation to swing disc 19 as a result of the rotation of drive disc 13, and also to allow potentiometer 15 to sense the rotation of swing disc 19.

Referring now to FIG. 1, recording pen 20 is shown detached from U-shaped mounting bracket 30. Recording pen 20 is a standard 7 1/16" galvanic skin response recording pen. Recording pen 20 has a weight 31 at the end opposite from tip 23 which is adjustable in order to provide counterbalance so that tip 23 easily moves along the chart recording paper during operation. Recording pen 20 has a bar 31A which is transverse to the length of the pen and serves to provide attachment of the pen with bracket 30. Bracket 30 is fittingly received over support shaft 21 and secured thereto by ring 32. Bar 31A fits between the vertical supports of U-shaped mounting bracket 30 which are outwardly bent at their upper ends to facilitate insertion of bar 31A.

Figure 3:
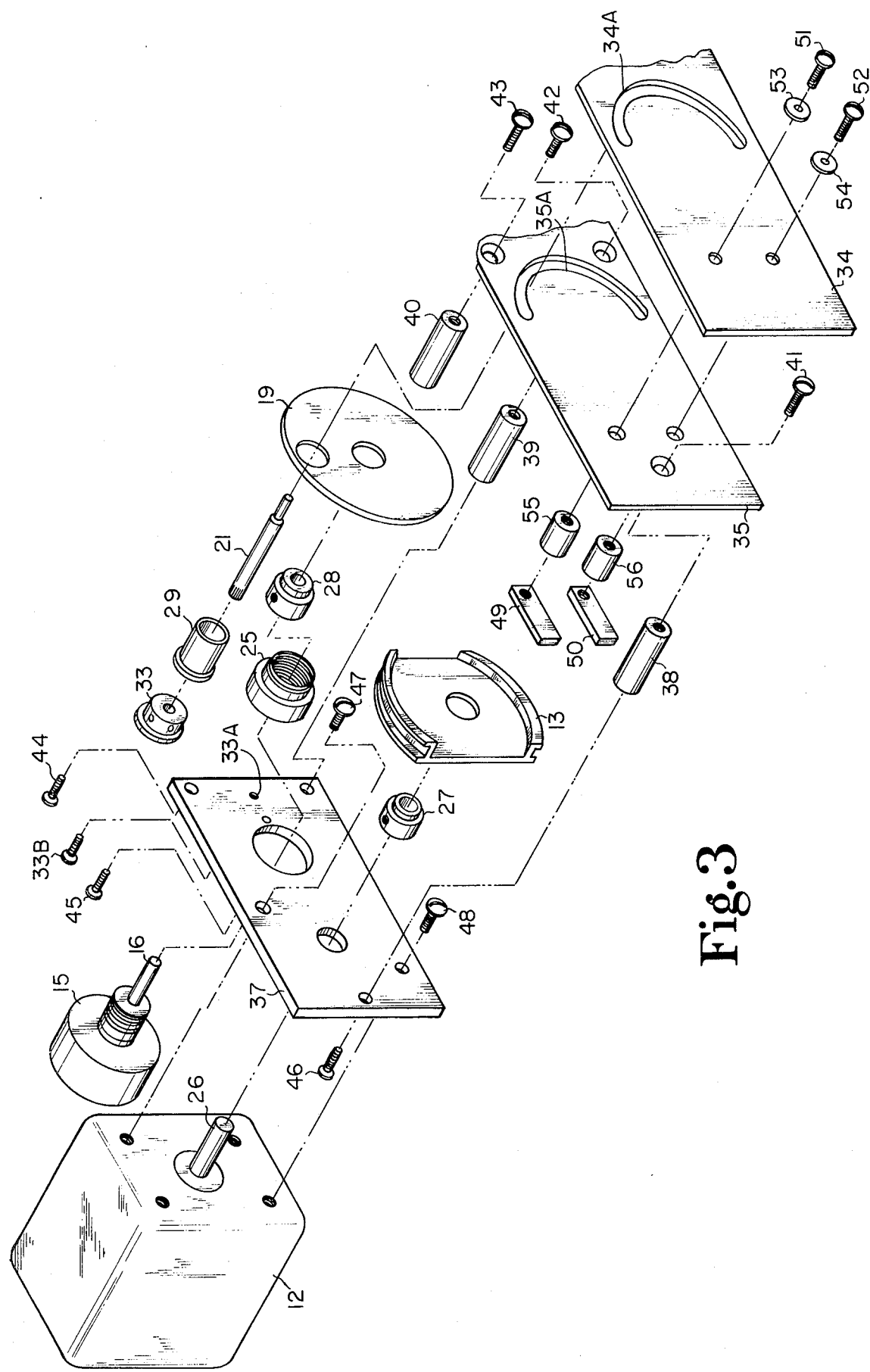
FIG. 3 is an exploded view showing details of the assembly of the rectilinear pen movement apparatus.

Referring now to FIGS. 2 and 3, support shaft 21 is supported for rotation on axis 22 within bearing sleeve 29, which is in turn press fitted within an aperture in swing disc 19. Rotational movement about axis 17 is provided to the recording pen by swing hub 33 which is press fitted onto the lower end of support shaft 21. One end of belt 24 is firmly attached to stationary hub 25 via a knot. Then, after a half-wrap around stationary hub 25, belt 24 is tightly wrapped twice around swing hub 33, whereupon belt 24 is threaded through a hole in swing hub 33 in order to ensure against slippage if external forces are exerted upon recording pen 20 to force rotation. Belt 24 is then brought back to stationary hub 25 and tightly wrapped on the opposite side from which it started. Belt 24 is then passed through aperture 33A and secured tightly by screw 33B on support frame 11. In a manner similar to that described for belt 18, adhesive is applied to the knot securing one end of belt 24, and also screw 33B and the hole in swing hub 33 in order to guard against slippage. Thus, angular movement of support shaft 21 in the opposite direction to swing disc 19 is achieved by support shaft 21 being linked via pulley action to stationary hub 25 by means of swing hub 33 and belt 24. It is readily perceived that the amount of angular movement is governed by the difference in diameters of stationary hub 25 and swing hub 33.

Referring now to FIGS. 1 and 3, the assembly of the present invention is shown in more detail. Support frame 11 is shown including a top panel 34 and a backup panel 35 which together form a top mounting plate. Top panel 34 and backup panel 35 have aligned arcuate slots 34A and 35A receiving therethrough pen support shaft 21 to permit the rotation of pen support shaft 21 about axis 17. Support frame 11 also includes a bottom mounting plate 37 which is secured to top panel 34 and backup panel 35 via spacer supports 38–40 and screws 41–46. Drive motor 12 is rigidly connected to bottom mounting plate 37 via screws 47 and 48. The present invention also includes a pair of adjustment arms 49 and 50 which are connected to top panel 34 and backup panel 35 by screws 51 and 52 and lockwashers 53 and 54. Spacer members 55 and 56 serve to position adjustment arms 49 and 50 so that they can limit the rotational travel of drive disc 13. Thus, is it readily seen that adjustment arms 49 and 50 may be positioned to limit the swing of tip 23 within width A shown in FIG. 4 to prevent tip 23 from swinging off the chart paper. Potentiometer 15 is firmly attached to bottom mounting plate 37 by stationary hub 25 which is press fitted within aperture 37A in bottom mounting plate 37.

It should be apparent from the aforementioned description that rectilinear pen movement apparatus 10 represents a highly accurate apparatus for producing a rectilinear chart recording of galvanic skin response. The present invention is both easy to assemble and to repair because of the simplicity of construction, and has a very compact design.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

I claim:

1. An improved rectilinear pen movement apparatus responsive to an electrical input signal representing a measurement of galvanic skin resistance in order to provide a recorded analog representation of the input signal, said apparatus comprising;

a support frame;

a drive motor mounted to said frame, said drive motor having an output means, said output means having a cylindrically shaped surface, said output means capable of rotating on a first axis in response to an input signal providing an electrical measurement of galvanic skin resistance;

a feedback means mounted to said frame, said feedback means having an input shaft capable of rotating on a second axis parallel to said first axis;

a first belt engaging said output means and said input shaft to rotate said input shaft in proportion to the rotation of said output means, said feedback means sensing the rotation of said input shaft and producing a negative feedback signal;

a swing disc connected to said input shaft and rotatable on said second axis;

a pen support means rotatably mounted to said swing disc for rotation on a third axis parallel to said first and second axes as said pen support means rotates about said second axis;

a stationary hub rigidly connected to said frame, said hub having a surface which is cylindrically shaped about said second axis;

a second belt engaging said hub and said pen support means in order to rotate said pen support means as said swing disc is rotated on said second axis;

a recording pen having two ends, said first end connected to said support means, said second free end movable rectilinearly in response to rotation of said output means in order to provide a recorded analog representation of said input signal.

2. The rectilinear pen movement apparatus of claim 1, wherein said feedback means is a potentiometer.

3. The rectilinear pen movement apparatus of claim 2, wherein said output means includes a drive shaft and a drive disc, and said first belt engages the drive disc of said output means.

4. The rectilinear pen movement apparatus of claim 3 and further comprising;

a second hub having a surface which is cylindrically shaped about said third axis, said second hub rigidly secured to said frame and engaging said first belt in order to prevent said first belt from slipping relative to said input shaft.

5. The rectilinear pen movement apparatus of claim 4, wherein said support means includes a support shaft and a rotatable hub, rigidly connected to said shaft and said second belt engages the rotatable hub of said support means, said support shaft rotatably received within said third hub.

6. The rectilinear pen movement apparatus of claim 5, wherein said recording pen has a length of between $6\frac{1}{2}$ inches–$7\frac{1}{2}$ inches between said first and second ends, and said second end has a rectilinear sweep of approximately 8 inches.

* * * * *